Oct. 22, 1968
M. A. F. DOMER
3,406,536
RESILIENT COUPLING DEVICES
Filed Feb. 23, 1967
2 Sheets-Sheet 1
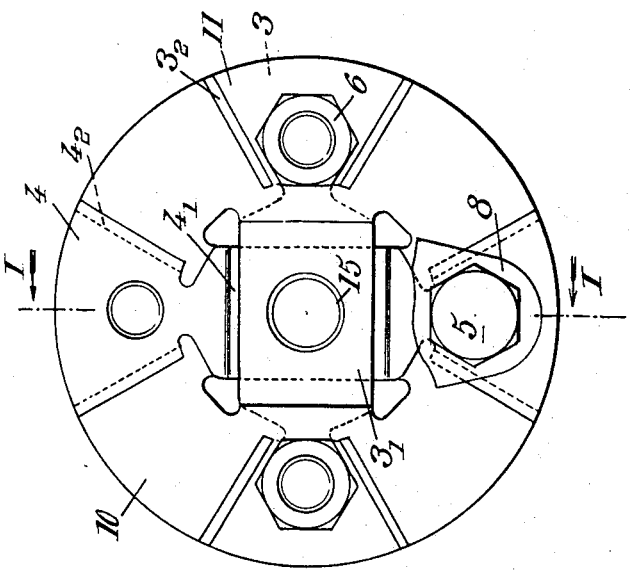
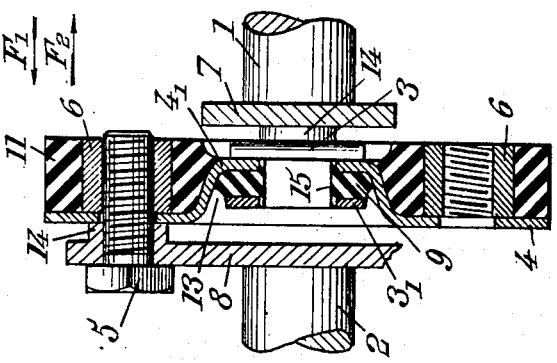
INVENTOR
BY
ATTORNEY

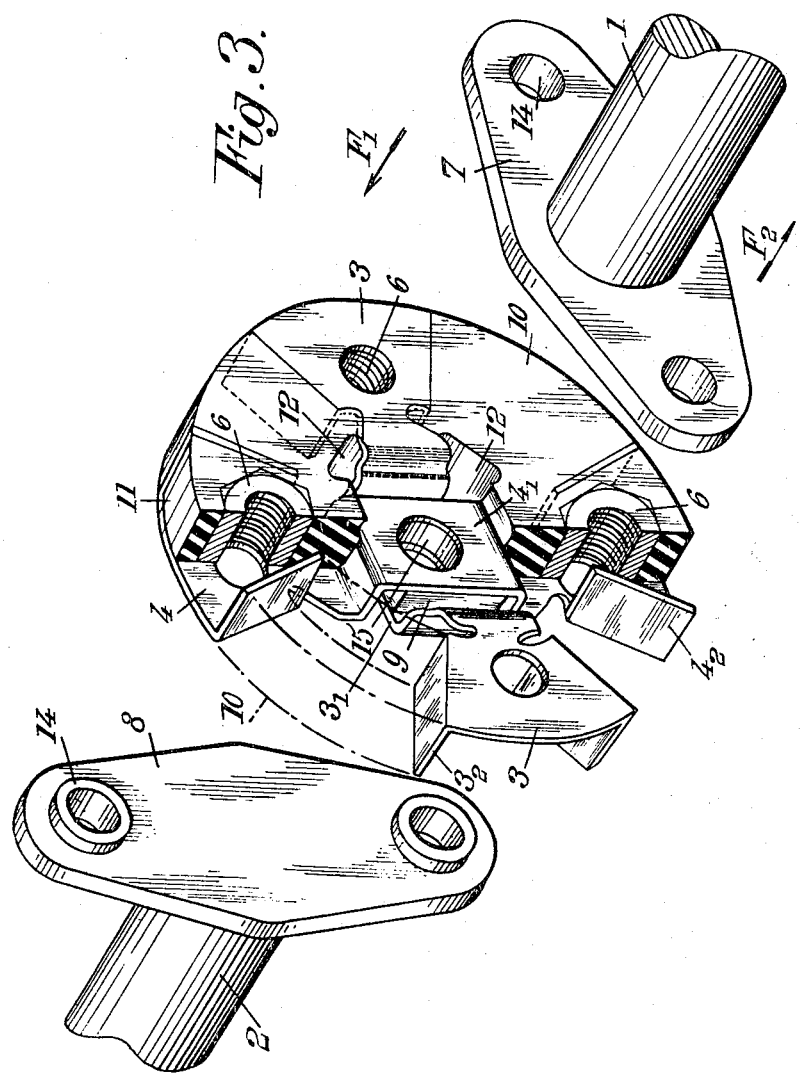

United States Patent Office 3,406,536
Patented Oct. 22, 1968

3,406,536
RESILIENT COUPLING DEVICES
Michel André François Domer, Montigny-les-Cormeilles, France, assignor to Paulstra, Levallois-Perret, France, a French society
Filed Feb. 23, 1967, Ser. No. 618,012
Claims priority, application France, Mar. 2, 1966, 51,685
9 Claims. (Cl. 64—14)

ABSTRACT OF THE DISCLOSURE

For resiliently coupling, for instance, a shaft rigid with a vehicle steering wheel with the shaft of the steering gear of said vehicle, the device comprises two strips extending transversely to the common axis of said shafts and in directions at right angles to each other, said strips being fixed to said shafts, respectively, a rubber block being interposed between said two strips so as partly to absorb axial forces exerted on said steering wheel shaft, torques being transmitted from the steering wheel shaft to the steering gear shaft through rubber blocks in the form of cylindrical sectors interposed between said strips.

---

The present invention relates to resilient coupling devices intended to be interposed between two rotating parts which are coaxial, or substantially so, in such manner as to ensure a resilient transmission of torques from one of said parts or the other. The invention is more especially concerned with devices of this kind serving resiliently to absorb at least some of the axial forces exerted in one direction or the other on one of said two parts with respect to the other, as it is the case, for instance, for the resilient coupling devices mounted on the steering columns of automobile vehicles.

The object of this invention is to provide a device of this kind which is better adapted to meet the requirements of practice than those used up to this time.

According to the present invention, the coupling device comprises two transverse rigid strips secured respectively to the two rotating parts to be coupled together, the central portion of each strip being offset with respect to the end portions thereof in the axial direction of said parts and away from the part to which said strip is secured, the two strips being mounted crosswise to each other and the inner faces of said central portions of said strips facing each other, with a block of rubber or another resiliently compressible material interposed between them, relatively narrow spaces, advantageously containing rubber blocks or the like fitted therein, being left between each rotating part and the outer face of the central portion of the strip secured to the other rotating part and resilient means being provided for angularly connecting together the end portions of the respective strips, said means preferably comprising cylindrical sector shaped blocks of rubber or another resiliently deformable material interposed between suitable flanges of the end portions of the strips.

A preferred embodiment of the invention will be hereinafter described with reference to the appended drawings, given merely by way of example, and in which:

FIG. 1 is an axial sectional view of a resilient coupling device, the section plane being I—I of FIG. 2;

FIG. 2 is an end view corresponding to FIG. 1;

FIG. 3 is an exploded perspective view of the device of FIGS. 1 and 2.

It will be supposed that the device according to the present invention as illustrated by the drawings is intended resiliently to couple with each other a shaft 1 rigid with a vehicle steering wheel and a shaft 2 belonging to the remainder of the steering gear of said vehicle.

It is reminded that the steering wheels of motor vehicles are generally connected with the steering columns through resilient coupling devices intended to absorb the angular vibrations or shocks imparted to the steering wheel and/or to the steering column so as to make steering control smoother.

These devices further have some resiliency in the axial direction, but, in known constructions, this axial resiliency is generally too great for efficiently and repeatedly absorbing the thrust and traction forces, often sudden and/or intensive, exerted by the driver on the steering wheel, either willfully or not.

The device according to the present invention permits of safely limiting to a relatively low value the axial resiliency deformations of such devices while preserving their flexibility and their resiliency, at least within admissible axial deformation limits.

Such a device comprises two transverse strips 3 and 4 respectively rigid with shafts 1 and 2 and disposed crosswise with respect to each other.

Each strip is made of sheet iron cut and folded so as to include a central portion deformed in U-shaped fashion the bottom of the U forming a flat transverse portion ($3_1$, $4_1$). This middle portion is offset in the axial direction with respect to the end portions of the strip in the direction away from the corresponding shaft. The end portions are in the form of circular sectors provided with flat flanges $3_2$, $4_2$ extending on the same side as the middle portion, preferably a little beyond the plane of said middle portion.

Strips 3 and 4 are mounted through bolts 5 and nuts 6 on collars 7 and 8 integral with shafts 1 and 2 so that the centers of said strips are located on the common axis of shafts 1 and 2 and the inner faces of the middle portions $3_1$ and $4_1$ of said strips are facing each other.

A block 9 (FIGS. 1 and 3) of rubber or other resiliently compressible material is interposed between these inner faces to which it is safely glued.

Furthermore, four blocks 10 in the form of cylindrical sectors (such as that shown in dot-and-dash lines in FIG. 3) of rubber or another resiliently deformable material are disposed each between two flanges $3_2$ and $4_2$ facing each other and belonging respectively to the adjacent end portions of the strips, said blocks 10 being safely glued to said flanges.

In the embodiment shown by the drawings, these blocks 10 are not independent but they belong to the same annular piece 11 mounted directly on the strips and which also fills each of the spaces comprised between the two flanges of a strip end portion.

Nuts 6 have six faces embedded in annular piece 11 and each of the flanges $3_2$ to $4_2$ is parallel to one face of said nut and either in contact therewith or separated therefrom merely by a thin layer of the resilient material.

This arrangement has the two following advantages:

The fact that two faces of every nut bear against corresponding flanges prevents this nut from turning about its axis when the corresponding bolt 5 is screwed, whereby blocking spanners are unnecessary and the risks of accidental unscrewing are reduced.

Secondly, when the coupling device is accidentally subjected to an excessive torque, the bearing of the flanges against faces of the bolt prevents these flanges from bending under the effect of high compressions of rubber blocks 10.

Of course, these advantages would also be obtained if, instead of nuts 6, the heads of bolts 5 were embedded in annular piece 11.

This annular piece 11, which has the general shape of a flat disc with parallel faces extends toward the center as far as the sides of the U-shaped portions of the strips.

It is provided with recesses 12 at the places where it would undergo great torsional or bending stresses, which permits deformation of the whole without tearing of the material or dangerous stresses.

In the embodiment shown by the drawings, the whole of central block 9 and of annular piece 11 is molded and vulcanized as a single piece, suitable cores or projections being provided in the mold to reserve in the molded mass, the above mentioned recesses 12 and 13.

It should be noted that, after assembly of the device, the central portions of collars 7 and 8 are located opposite the external surfaces of the strip central portions $3_1$ and $4_1$, at a short distance therefrom.

At least a portion of this small distance might be filled by a cushion of rubber or the like.

In order to increase this distance, there is provided, between collars 7, 8 and strips 3, 4, spacing sleeves 14 adapted to surround bolts 5, these sleeves being for instance integral with the collars.

A centering hole 15 is provided in the strip central portions $3_1$ and $4_1$ and in block 9 located between them.

The device above described according to this invention behaves as a conventional resilient joint concerning resiliency under torsional or bending stresses. This resiliency depends essentially upon the nature and the dimensions of blocks 10 and it may be relatively important.

On the contrary, the amplitude of the resilient deformations is limited in the axial direction.

If the driver exerts a thrust upon the steering wheel, collar 7 is urged in the direction of arrow $F_1$ (FIGS. 1 and 3), which tends to move middle portions $3_1$ and $4_1$ away from each other and causes block 9 to deform by expansion. The amplitude of this deformation is limited by the fact that the outer faces of these middle portions $3_1$ and $4_1$ come, after sufficient deformation, into contact with the respective collars 7, 8. From this time on the thrust of shaft 1 is transmitted directly to shaft 2. This transmission may be made resilient by the interposition of a resilient layer between the surfaces coming into abutment relation with each other.

If, on the contrary, the driver exerts a pulling force on the steering wheel, collar 7 is urged in the direction of arrow $F_2$ and block 9 is crushed, the maximum deformation thereof being as small as it may be desired, with a perfect safety.

In other words, the resistance of the coupling device to pulling forces (which forces are generally most intensive and dangerous in the case of steering gears) is ensured in a resilient fashion by compression of a resilient block.

In a general manner, while the above description discloses what is deemed to be a practical and efficient embodiment of the present invention, said invention is not limited thereto as there might be changes made in the arrangement, disposition and form of the parts without departing from the principle of the invention as comprehended within the scope of the appended claims.

What I claim is:

1. A device for resiliently coupling together two rotating parts having, at least substantially, the same axis of rotation and the respective ends of which face each other, which comprises, in combination, two rigid strips rigid with said parts, respectively, and extending both at right angles to said axis and each at right angles to the other, each of said strips including a central portion and two end portions located at least substantially in planes at right angles to said axis, the plane of said central portion being offset with respect to that of said end portions away from the end of the rotary part to which it is secured, said central portions of said strips being located opposite each other, a block of a resilient material interposed between said central portions of said strips, the central portion of each of said strips being located at a short distance, in the axial direction, from the end of the rotary part to which the other strip is secured, and resilient means interposed between the corresponding end portions of said two strips for preventing rotation of said two strips with respect to each other about said axis.

2. A coupling device according to claim 1 wherein said strip end portions carry, integral therewith, flanges located substantially in respective planes passing through said axis, and said resilient means comprise blocks of a resilient material in the form of cylindrical sectors interposed between said flanges.

3. A coupling device according to claim 2 wherein said cylindrical sector shaped blocks are portions of a single annular element.

4. A coupling device according to claim 3 wherein said annular element is in the form of a flat annular disc having opposed faces at right angles to said axis.

5. A coupling element according to claim 3 wherein said block interposed between said central portions of said strips is integral with said annular element to form a single piece therewith, said piece being provided with recesses and hollows to permit resilient deformation thereof without undue stresses.

6. A coupling element according to claim 2 wherein said strip end portions are in the form of circular sectors having their center on said axis, said flanges extending from the radial sides of said sectors in the direction toward which the central portion of the corresponding strip is offset.

7. A coupling device according to claim 6 comprising, for securing said strips to said rotary parts, at least two bolt and nut assemblies, at least one of the two elements of each of said assemblies being polygonal in cross section, with two sides of said polygonal cross section adjoining the flanges of a strip end portion, at a short distance therefrom and parallelly thereto.

8. A coupling device according to claim 6, wherein said strip flanges extend beyond the plane in which is located the central portion of the corresponding strip.

9. A coupling device according to claim 1 comprising, for securing said strips to said rotary parts, fixation means arranged to keep the central portion of each of said strips at a distance from the axial portion of the rotary part opposite which said strip central portion is located.

References Cited

UNITED STATES PATENTS

| | | | |
|---|---|---|---|
| 2,421,134 | 5/1947 | Venditty | 64—14 |
| 2,537,847 | 1/1951 | Neher | 64—14 |
| 2,972,240 | 2/1961 | Wood | 64—11 X |
| 3,301,011 | 1/1967 | Dye et al. | 64—27 |

HALL C. COE, *Primary Examiner.*